(12) United States Patent
Mead

(10) Patent No.: US 6,614,478 B1
(45) Date of Patent: Sep. 2, 2003

(54) COLOR SEPARATION PRISMS HAVING SOLID-STATE IMAGERS MOUNTED THEREON AND CAMERA EMPLOYING SAME

(75) Inventor: Carver A. Mead, Santa Clara, CA (US)

(73) Assignee: Foveon, Inc., Santa Clara, CA (US)

( * ) Notice: Subject to any disclaimer, the term of this patent is extended or adjusted under 35 U.S.C. 154(b) by 0 days.

(21) Appl. No.: 09/302,565

(22) Filed: Apr. 30, 1999

(51) Int. Cl.[7] .............................. H04N 9/07; H04N 9/09; G02B 5/04
(52) U.S. Cl. ..................... 348/337; 348/265; 359/834
(58) Field of Search ........................ 348/208.8, 259, 348/336, 337, 340, 335, 374–376, 265; 359/834

(56) References Cited

U.S. PATENT DOCUMENTS

| | | | |
|---|---|---|---|
| 3,659,918 A | 5/1972 | Tan | 350/166 |
| 4,009,941 A | 3/1977 | Verdijk et al. | 350/173 |
| 4,035,836 A | 7/1977 | Miyaji et al. | 358/55 |
| 4,072,405 A | 2/1978 | Ozeki | 350/173 |
| 4,262,305 A | 4/1981 | Sekiguchi et al. | 358/55 |
| 4,268,119 A * | 5/1981 | Hartmann | 348/338 |
| 4,323,918 A | 4/1982 | Bendell | 358/50 |
| 4,418,284 A | 11/1983 | Ogawa | 250/578 |
| 4,507,679 A | 3/1985 | Bendell | 358/55 |
| 4,591,901 A | 5/1986 | Andrevski | 358/50 |
| 4,622,580 A * | 11/1986 | Levine | 348/337 |
| 4,623,916 A | 11/1986 | Levine | 358/50 |
| 4,789,891 A | 12/1988 | Kanayama | 358/55 |
| 4,916,529 A | 4/1990 | Yamamoto et al. | 358/50 |
| 5,042,913 A | 8/1991 | Yamamoto | 359/640 |
| 5,134,468 A * | 7/1992 | Ohmuro | 348/337 |
| 5,340,420 A | 8/1994 | Ozimek | 156/64 |
| 5,418,566 A * | 5/1995 | Kameishi | 348/294 |
| 5,554,939 A * | 9/1996 | Hirae et al. | 324/753 |
| 5,570,231 A | 10/1996 | Mogamiya | 359/640 |
| 5,644,432 A | 7/1997 | Doany | 395/634 |

FOREIGN PATENT DOCUMENTS

| | | | |
|---|---|---|---|
| JP | 54-111419 | 8/1979 | |
| JP | 58-063279 | 4/1983 | ............ H04N/9/04 |
| JP | 61-135279 | 6/1986 | .......... H04N/5/225 |
| WO | WO 93/1163 | 6/1993 | .......... H04N/5/335 |
| WO | WO/93/11631 | 10/1993 | .......... H04N/5/335 |

OTHER PUBLICATIONS

H.De Lang et al., "Colour Separation in Colour–Television Cameras", *Phillips Technical Review*, V. 24, No. 9, pp. 263–298, Aug. 1963.

R.W.G. Hunt, *The Reproduction of Colour*, pp. 450–455, 470–471,478–481, Fountain Press,,1995.

* cited by examiner

*Primary Examiner*—Andrew Christensen
(74) *Attorney, Agent, or Firm*—Sierra Patent Group, Ltd.

(57) ABSTRACT

A method for attaching imagers to color-separation prisms includes the steps of: arranging three solid-state array image sensor integrated circuits behind and in close proximity to the output faces of a color-separating prism having substantially equal optical path lengths for the three paths, the three solid-state array image sensor integrated circuits each having a solid-state array image sensor and bonding pads for electrical connections disposed on a top face thereof; aligning the three sensors such that the images traversing the three paths are coincident within a pixel dimension of the image sensors; filling the space between each output face of the prism and the top face of the corresponding image sensor with index-matched adhesive; and causing the index-matched adhesive to become rigid while maintaining the alignment of the three image sensors.

3 Claims, 3 Drawing Sheets

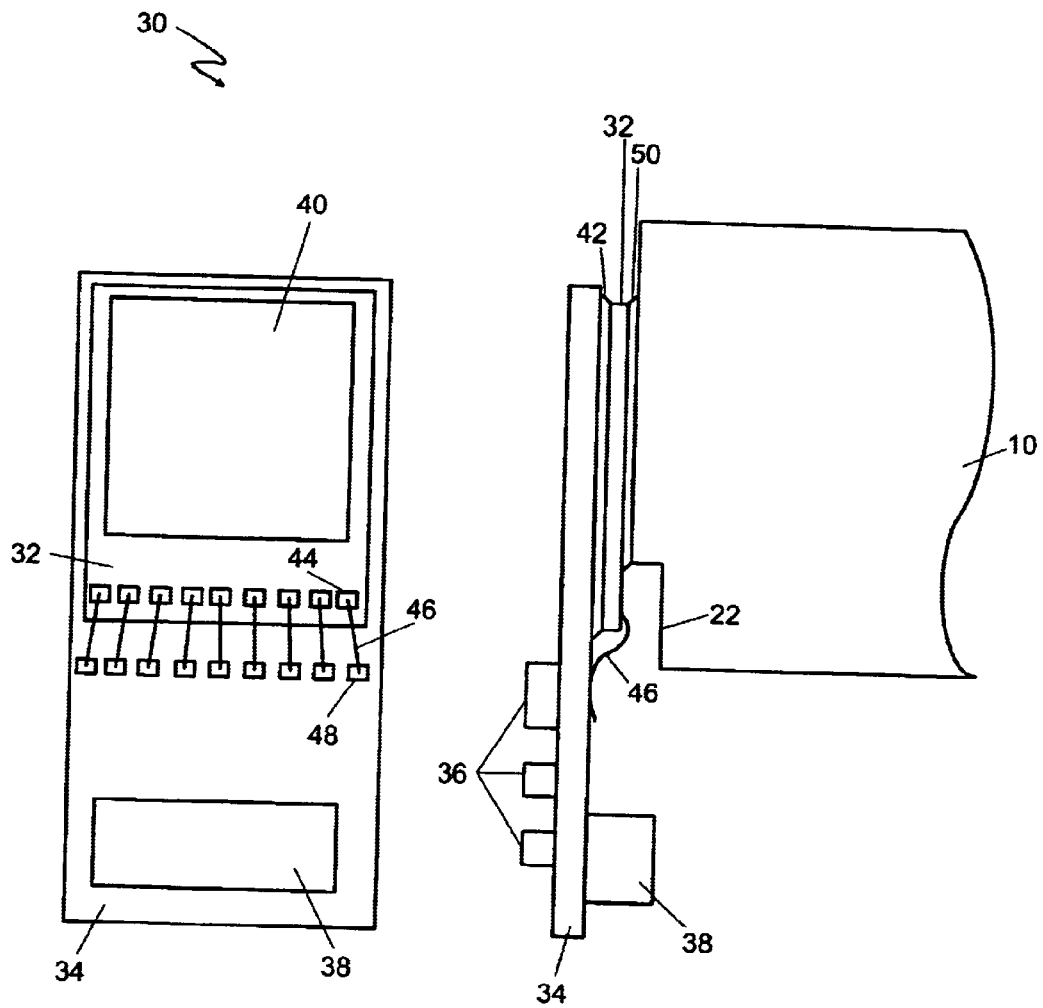
FIG. 2  FIG. 3

COLOR SEPARATION PRISMS HAVING SOLID-STATE IMAGERS MOUNTED THEREON AND CAMERA EMPLOYING SAME

BACKGROUND OF THE INVENTION

1. Field of the Invention

The present invention relates to solid-state imagers. More particularly, the present invention relates to solid state imagers mounted onto color separation prisms, methods for attaching such solid-state imagers to color separation prisms, and cameras employing same.

2. The Prior Art

In the art of electronic imaging, it is necessary to resolve the incoming image into a minimum of three primary colors. The principles are well understood, and are adequately described in the book "The Reproduction of Colour" by R. W. G. Hunt, published by Fountain Press, 1995. Historically, three principal methods have been employed, originally with photo-sensitive vacuum tube sensors (vidicons, image orthicons, etc.), and more recently with silicon CCD imaging chips.

In the first method, the sensor is sequentially exposed to the image, first through a first filter, then through a second filter, then through a third filter. A separate image is captured through each filter, thus forming the basis of a color image. The advantages of the sequential method are that only one image sensor is required, and the three images are automatically aligned with each other. Disadvantages of the sequential method are the cost and complexity of the mechanism used to sequentially place the color filters in the image path, that at least three times the exposure time is required, compared with that of a single sensor, that color artifacts are produced by moving objects in action images, and that synchronization with a flash lamp is problematic.

In the second method, each picture element (pixel) of the sensor is provided with a separate color filter. The filters are arranged in a mosaic pattern, and a separate image is captured from the subset of pixels covered by each color of filter, thus forming the basis of a color image. The advantages of the mosaic method are that only one image sensor is required, and the three images are automatically aligned with each other, and that all three images are captured at the same time. Disadvantages of the mosaic method are that three to four times the exposure time is required, compared with that of a single sensor, that color artifacts are produced due to details in the image aliasing against the periodic mosaic filter array, that the sensor is two to three times the area of a single-color sensor of the same resolution, and that a complex process is required to apply the filter mosaic.

The last two disadvantages significantly decrease the manufacturing yield of the sensors, thus increasing their cost.

In the third method, a color-separation prism is used to split the incoming image into three separate images, one in each wavelength range. Three separate sensors are used, each capturing the image from one wavelength range, thus forming the basis of a color image. The advantages of the prism method are that all the incoming light in each wavelength band is available to the corresponding sensor, thus shortening exposure time by typically a factor of four compared with either of the other methods, that the full resolution of each individual sensor contributes to the final resolution, thus allowing the use of smaller sensors for a given final resolution and thereby improving the yield of the sensors and greatly decreasing aliasing artifacts, that a simple process can be used to fabricate the sensor, since no special filters must be added to it, and that all three images are captured at the same time, making flash synchronization easy. Disadvantages of the prism method are the expense of the prism, and the cost of the critical alignment of the sensors with each other. Thus the prism method appears to be the preferred method of color separation for electronic imaging systems, if its cost could be reduced to a level comparable with that of the other methods.

Many methods have been developed for attaching solid-state imagers to color-separation prisms and other optical components. Numerous such methods have been described in the patent literature.

U.S. Pat. No. 4,268,119 to Hartmann teaches the use of foamed gaskets to space the detectors from the prism faces.

U.S. Pat. No. 4,323,918 to Bendell teaches the use of a hollow spacer between the prism face and the imaging device.

U.S. Pat. No. 4,418,284 to Ogawa et al. discloses a method for bonding a color filter to a solid state image sensor using an ultraviolet light curable adhesive. The bonding step is carried out in an oxygen atmosphere to prevent curing of adhesive squeezed out of the space between the bonded members.

U.S. Pat. No. 4,507,679 to Bendell discloses a television camera that employs a mounting technique also involving the use of spacers between the prism face and the imaging device.

U.S. Pat. No. 4,622,580 to Levine teaches bonding a thinned-substrate solid-state imager chip to a prism face having an interconnect metallization pattern formed thereon. Bonding wires for making electrical connections to the imager chip are disposed between bonding pads on the back side of the imager chip and corresponding bonding pads on the prism face.

U.S. Pat. No. 4,591,901 to Andrevski teaches the use of a metal bracket to hold imaging devices behind the output faces of a prism.

U.S. Pat. No. 4,623,916 to Levine teaches a metal bracket which positions individual imaging devices at the output ports of a prism, in which the positions of the imaging devices are secured by means of metal solder.

U.S. Pat. No. 4,789,891 to Kanayama and Tanaka teaches the adhesive attachment of solid image pickup elements to the faces of a prism by means of tapered spacers.

U.S. Pat. No. 4,916,529 to Yamamoto and Ohmuro teaches the mounting of imagers to the output faces of a prism by means of a solder layer, which also serves to space the imager away from the prism face.

U.S. Pat. No. 5,042,913 to Yamamoto also teaches the spacing of imagers from the output faces of a prism by means of metal parts, adhered to the glass prism faces by means of solder.

U.S. Pat. No. 5,340,420 to Ozimek et al. discloses a method for bonding a color separation filter to an image sensor. Wires for making electrical connections to the image sensor are wire bonded to bonding pads on the image sensor and on a required carrier for the image sensor.

U.S. Pat. No. 5,570,231 to Mogamiya teaches the positioning of imagers opposite the output faces of a prism and spaced therefrom by means of a precision mechanical clamping arrangement.

U.S. Pat. No. 4,507,679 to Bendell shows CCD image planes spaced a substantial distance behind the output face of a prism.

Japanese patent application 58-63279 shows a metal spacer similar to that of Yamamoto.

Japanese patent application 61-135279 shows metal spacers separating imaging elements from the output faces of a prism.

In all the prior art except for U.S. Pat. No. 4,622,580, the imaging array has been treated as a separate component, usually packaged in an electronic enclosure with a glass window. Three of these packaged imaging array devices are mounted opposite the output faces of a color-separation prism by one of the means described in the prior art.

There are several problems inherent in the prior-art approaches to the mounting of imagers. First, the output faces of the prism and the front and back surfaces of the glass windows generate reflections that degrade image quality. Second, the windowed packages are expensive. Third, the attachment procedures mentioned are complex and costly. The method disclosed in U.S. Pat. No. 4,622,580 requires that electrical connections to the imager be made from the face of the imager opposite that containing the imaging array.

BRIEF DESCRIPTION OF THE PRESENT INVENTION

The present invention teaches a method for mounting solid-state array image sensor integrated circuits directly to the output faces of a color-separating prism. The method of the present invention includes the steps of: arranging three solid-state array image sensor integrated circuits behind and in close proximity to the output faces of a color-separating prism having substantially equal optical path lengths for the three paths, the three solid-state array image sensor integrated circuits each having a solid-state array image sensor and bonding pads for electrical connections disposed on a same face thereof; aligning the three sensors such that the images traversing the three paths are coincident within a pixel dimension of the image sensors; filling the space between each output face of the prism and the front surface of the corresponding solid-state array image sensor integrated circuit with index-matched adhesive; and causing the index-matched adhesive to become rigid while maintaining the alignment of the three solid-state array image sensor integrated circuits.

According to one embodiment of the invention, each output face of the color-separation prism has a step incorporated therein to provide space for the electrical connections to be made from the solid-state array image-sensor integrated circuits to the circuit boards upon which they are mounted.

The method of the present invention is simpler than the prior-art methods, eliminates undesired reflections from glass surfaces between the prism and the surface of the imaging arrays, and eliminates the cost of a separate package for each imaging array. The method involves using an index-matched adhesive to adhere the imaging array directly to the prism face, thereby eliminating any air gap between the prism face and the surface of the imaging array. An essential aspect of the invention is to fabricate the prism in such a way that the effective optical path length from the input face to the three output faces is well matched. The index of refraction of optical glass changes with wavelength. If the color-separating prism is fabricated in such a way that the physical distances traveled by light rays from the input face to the three output faces is equal, the three color images will not be simultaneously in focus on the three output faces. The reason is that the effective optical path length is the physical path length divided by the index of refraction at the wavelength corresponding to the color light traveling the particular path. Prisms fabricated in this manner are known in the art.

In addition, the method of the present invention avoids the use of fragile thin substrates and eliminates the need for employing a wiring pattern on the prism faces. The assembly of the imagers onto the prism is therefore made simpler.

BRIEF DESCRIPTION OF THE DRAWING FIGURES

FIG. 2 is a top view of an imaging chip mounted on a chip-on-board module that may be used in the present invention.

FIG. 3 is a side view of the imaging chip mounted on the chip-on-board module and attached to one face of the prism of FIG. 1.

DETAILED DESCRIPTION OF A PREFERRED EMBODIMENT

Persons of ordinary skill in the art will realize that the following description of the present invention is illustrative only and not in any way limiting. Other embodiments of the invention will readily suggest themselves to such skilled persons having the benefit of this disclosure.

The present invention will work with many color-separation prism designs. Non-exhaustive examples include the prism assembly disclosed in U.S. Pat. No. 5,644,432, the prism assembly disclosed in U.S. Pat. No. 3,659,918, the prism assembly disclosed in U.S. Pat. No. 4,009,941, the prism assembly disclosed in U.S. Pat. No. 4,072,405, the prism assembly disclosed in U.S. Pat. No. 4,035,836, and the prism assembly disclosed in the article H. de Lang and B. Bouwhuis "Colour Separation in Colour-Television Cameras" Phillips Technical Review, vol. 24, no. 9, pp. 263–298, August 1963.

Figure 1:
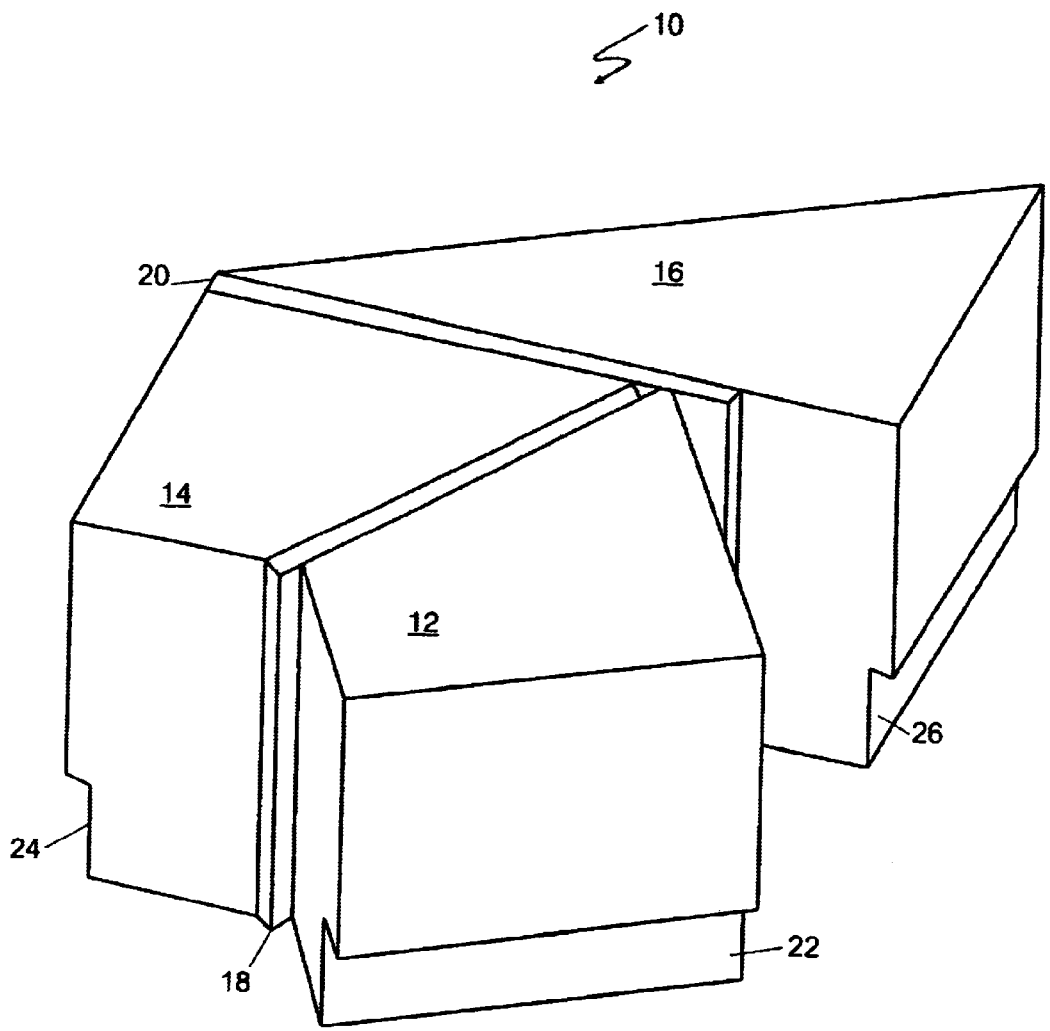
FIG. 1 is an isometric drawing of an illustrative color-separating prism that may be used in the present invention.

Referring first to FIG. 1, an isometric drawing of an illustrative color-separating prism 10 that may be used in the present invention is shown. The principles of operation of this prism, and other forms of color-separating prism designs are well known to those skilled in the art.

The particular prism shown in FIG. 1 is for purposes of illustration only, and is not intended to be limiting of the invention. Persons having ordinary skill in the art having the benefit of this disclosure would readily understand how to substitute a different prism design in the present invention.

Color-separating prism 10 is preferably formed from three individual pieces of optical-grade glass, 12, 14, and 16, although optical plastic may also be used. The dimensions and geometries of prism pieces 12, 14, and 16 are simply a matter of design choice as is known to those skilled in the art. Dichroic mirror 18 is sandwiched between prism pieces 12 and 14 and dichroic mirror 20 is sandwiched between prism pieces 14 and 16 as shown in FIG. 1 as is known in the color separation prism art.

According to one embodiment of the present invention, a notch 22 is formed into prism piece 12, a notch 24 is formed into prism piece 14, and a notch 26 is formed into prism piece 16. The purpose of notches 22, 24, and 26 is to allow space for the interconnection wires bonded to the metalization face of the imager.chip to be mounted directly to the three faces of prism 10. Locating the bonding wires on the metallization surface of the imager chip is advantageous for several reasons. First, it avoids the prior art problem encountered in the arrangement disclosed in U.S. Pat. No. 4,622,580 that requires both use of an imaging chip having a thinned substrate and formation of interconnect metalization lines on the prism output faces.

Referring now to FIGS. 2 and 3, chip-on board assemblies 30, comprising silicon image-sensing chips 32 mounted directly on circuit boards 34 using well-known and conventional chip-on-board technology, are employed according to a presently-preferred embodiment of the present invention. A top view of such an imaging chip 32 mounted on a chip-on-board module is shown in FIG. 2. A side view of such an imaging chip 32 mounted on a chip-on-board module 32 and attached to one face of prism piece 12 is shown in FIG. 3. Corresponding elements in each of FIGS. 2 and 3 are labeled with the same reference numerals in order to provide the clearest visualization of the invention. Multi-layer etched circuit board 34 is fabricated using conventional circuit board fabrication technology. The conductive traces on the surface of circuit board 34 (usually copper) are preferably plated with gold to facilitate the attachment of bonding wires, as will shortly be described herein. Circuit board 34 is fitted with components 36 (shown in FIG. 3), such as resistors, capacitors, and the like, and with connector 38 for attaching a multi-conductor cable to board assembly 30. Signals in this cable provide power to imaging chip 32, and accept output signals from imaging chip 32, representing information about the image impinging on the active sensing area 40 of imaging chip 32.

Silicon imaging chip 32 is attached by the side opposite active circuitry (bottom face opposite face to that of the active circuitry) to an area of the circuit board 34 using a layer of conductive adhesive 42. This adhesive is preferably one of the standard two-part silver-filled epoxy products available from any of a number of suppliers. The area of the circuit board 34 on which the chip 32 is mounted is preferably a gold-plated copper area having approximately the same area as the area of the chip. Silicon imaging chip 32 can be fabricated using any imaging technology, including CCD and/or CMOS, both of which are well known to those skilled in the art. Whatever the underlying technology, the imaging chip 32 is equipped with bond pads 44 for passing electrical signals onto and off of the chip. Contact to these bond pads 44 is accomplished by bonding wires 46, which connect the bonding pads 44 on the chip to conducting traces on the surface of board 32 via bonding pads 48 on the circuit board 32. Attachment of these bonding wires is accomplished using conventional ultrasonic bonding equipment and techniques. Notch 22 in the face of prism piece 12 must be cut deep enough into prism piece 12 to provide clearance for bonding wires 46. Persons of ordinary skill in the art will recognize that providing notch 22 in prism face 12 is merely one embodiment of the present invention, and that other techniques, such as extending the edge of imager chip 40 past the lower edge of prism piece 12, may be employed to prevent the interconnecting bonding wires from interfering with the optical interface.

Chip-on-board assembly 30 is tested to assure that it produces quality images, and then three tested chip-on-board assemblies are optically aligned and attached to the three output faces of prism 10. The attachment of one assembly to the face of piece 12 is shown in FIG. 3 for purposes of illustration. The surface of imaging chip 32 is brought to within less than 100 micrometers of the output face of prism piece 12. The active area of chip 32 must be aligned with the portion of surface of prism piece 12 that is above notch 22. Once the three imaging arrays 36 are brought into optical alignment with their respective glass pieces from the prism, each imaging chip 34 is attached to its corresponding prism face with index-matched adhesive 50. This adhesive should preferably have an index of refraction matched to that of prism piece 12. An ultraviolet cured adhesive, such as Norland 61 ("NOA61"), available from Norland Products, Inc. of New Brunswick, N.J. may be employed or a two-part system, such as EPO-TEK 301, available from Epoxy Technology, Inc. of Billerica, Mass., may also be employed for this purpose.

In any case, adhesive layer 50 must completely cover active area 40, and preferably does not attach to bonding wires 46. This implies that imaging chip 32 should preferably have its bonding pads far enough below active area 40 that they can be protected from adhesive layer 50. This requirement applies only to pads that are actually used in the final operation of the imager. Test pads can be located under adhesive layer 50 if no bond wires are attached to them.

Figure 4:
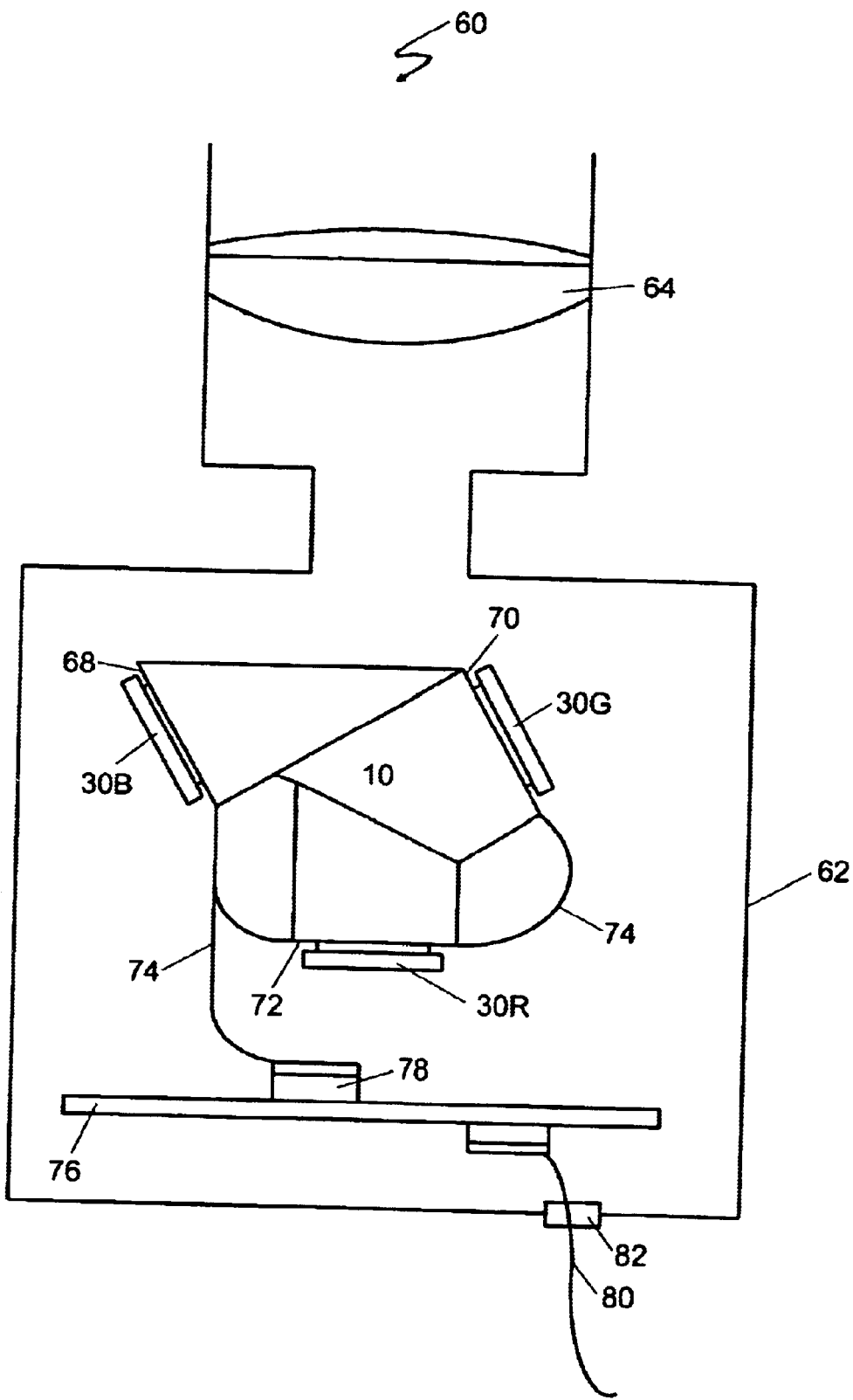
FIG. 4 is a schematic of an electronic camera according to the present invention.

Referring now to FIG. 4, an electronic camera 60 according to the present invention is illustrated in schematic form. Color-separating prism 10 is shown mounted inside light-tight housing 62. Lens 64 is fitted to the housing in such a manner that it projects an image on the input face 66 of the prism 10, which is thereby split into red, green, and blue images, which are each focussed on one of output faces 68, 70, and 72 of prism 10.

Attached to the three output faces of prism 10 are three chip-on-board assemblies 30, labeled 30R, 30G, and 30B, aligned in such a way that the color-separated images fall on their active areas in registration. Each of these assemblies is attached to its respective prism face in the manner shown in FIG. 3.

Signal connections to the chip-on-board assemblies 30R, 30G, and 30B are made by way of a ribbon: cable 74 which is fitted with three connectors that mate with connectors 38 of the 3 chip-on-board assemblies. In addition, ribbon cable 74 is attached to circuit board 76 by way of connector 78. Circuit board 76 comprises the support electronics for controlling the reading of image data from the three imagers mounted on the prism 10, as is understood by those skilled in the art. Out cable 80 carries power into camera assembly 60, and carries out of the camera assembly signals representative of the image entering lens 64. Cable 80 exits housing 62 through light-tight fixture 82.

While embodiments and applications of this invention have been shown and described, it would be apparent to those skilled in the art that many more modifications than mentioned above are possible without departing from the inventive concepts herein. The invention, therefore, is not to be restricted except in the spirit of the appended claims.

What is claimed is:

1. A method for attaching solid-state array image sensors to a color-separation prism comprising:

providing three solid-state array image sensor integrated circuits each having a solid-state array image sensor and bonding pads for electrical connections disposed on a same top face thereof, and each said solid-state array image sensor integrated circuit having bonding wires attached to a plurality of said bonding pads;

arranging said three solid-state array image sensor integrated circuits in close proximity to output faces of a color-separating prism having substantially equal optical path lengths, each said output face of each said prism having a notch extending from an edge thereof such that said bonding wires occupy a space defined between each said notch and said top face of each said solid-state array image sensor integrated circuit;

aligning the three solid-state array image sensor integrated circuits such that images traversing the three paths are coincident within a pixel dimension of the solid-state array image sensors;

filling a space between each said output face of the prism and the top face of each corresponding said solid-state array image sensor integrated circuit with index-matched adhesive; and causing the index-matched adhesive to become rigid while maintaining alignment of the three solid-state array image sensors.

2. The method of claim 1, wherein said three solid-state array image sensor integrated circuits are each mounted on separate circuit boards and electrically connected to said circuit boards by said bonding wires.

3. A digital camera comprising:

a light-tight housing;

a color separating prism disposed in said housing, said color-separating prism having an input face and a plurality of output faces, and further having optical paths between said input face and each of said output faces, all of said optical paths having substantially equal path lengths;

a lens optically coupled to said input face of said color-separating prism through said housing to project an image on said input face of said color-separating prism;

a plurality of solid-state array image sensor integrated circuits each having a solid-state array image sensor and bonding pads for electrical connections disposed on a same top face thereof to which bonding wires are attached, each said solid-state array image sensor integrated circuits bonded to one of said output faces of said color-separating prism with an index-matched adhesive in a position such that images traversing the optical paths are coincident within a pixel dimension of the image sensors and such that said bonding wires are not in contact with said adhesive, each said output face of each said prism having a notch extending from an edge thereof such that said bonding wires occupy a space defined between said notch and said top face of each said solid-state array image sensor integrated circuit; and control electronics coupled to said bonding wires for applying control signals to and reading image data from said solid-state array image sensor integrated circuits to create data representing a composite image.

\* \* \* \* \*